(12) United States Patent
Rosenthal et al.

(10) Patent No.: US 8,891,344 B1
(45) Date of Patent: Nov. 18, 2014

(54) WAVE-BASED OPTICAL DATA STORAGE

(76) Inventors: Eric Dean Rosenthal, Morganville, NJ (US); Richard Jay Solomon, Monson, MA (US); Clark Eugene Johnson, Madison, WI (US)

(*) Notice: Subject to any disclaimer, the term of this patent is extended or adjusted under 35 U.S.C. 154(b) by 0 days.

(21) Appl. No.: 13/506,970

(22) Filed: May 29, 2012

Related U.S. Application Data

(60) Provisional application No. 61/519,980, filed on Jun. 2, 2011.

(51) Int. Cl.
*G11B 7/0065* (2006.01)

(52) U.S. Cl.
USPC ...... 369/103; 369/108; 369/109.02; 369/121; 369/125; 369/288; 365/124; 365/216; 365/235; 359/3; 359/11; 359/22; 359/32

(58) Field of Classification Search
None
See application file for complete search history.

(56) References Cited

U.S. PATENT DOCUMENTS

| | | | | |
|---|---|---|---|---|
| 4,363,870 A | * | 12/1982 | Bouldin | 430/510 |
| 6,151,287 A | * | 11/2000 | Labeyrie | 369/103 |
| 6,479,214 B1 | * | 11/2002 | Albaum et al. | 369/283 |
| 2002/0191501 A1 | * | 12/2002 | Ueno | 369/44.13 |

* cited by examiner

*Primary Examiner* — Wayne Young
*Assistant Examiner* — Brian Butcher

(57) ABSTRACT

The invention combines several techniques applying high-resolution photosensitive emulsions for the long-term, archival storage of data, images and text. Data is stored as vertical interference patterns of multiple frequencies in a photographic emulsion. Read-out of the stored data uses a precision mechanism to locate and decode stored data.

4 Claims, 2 Drawing Sheets

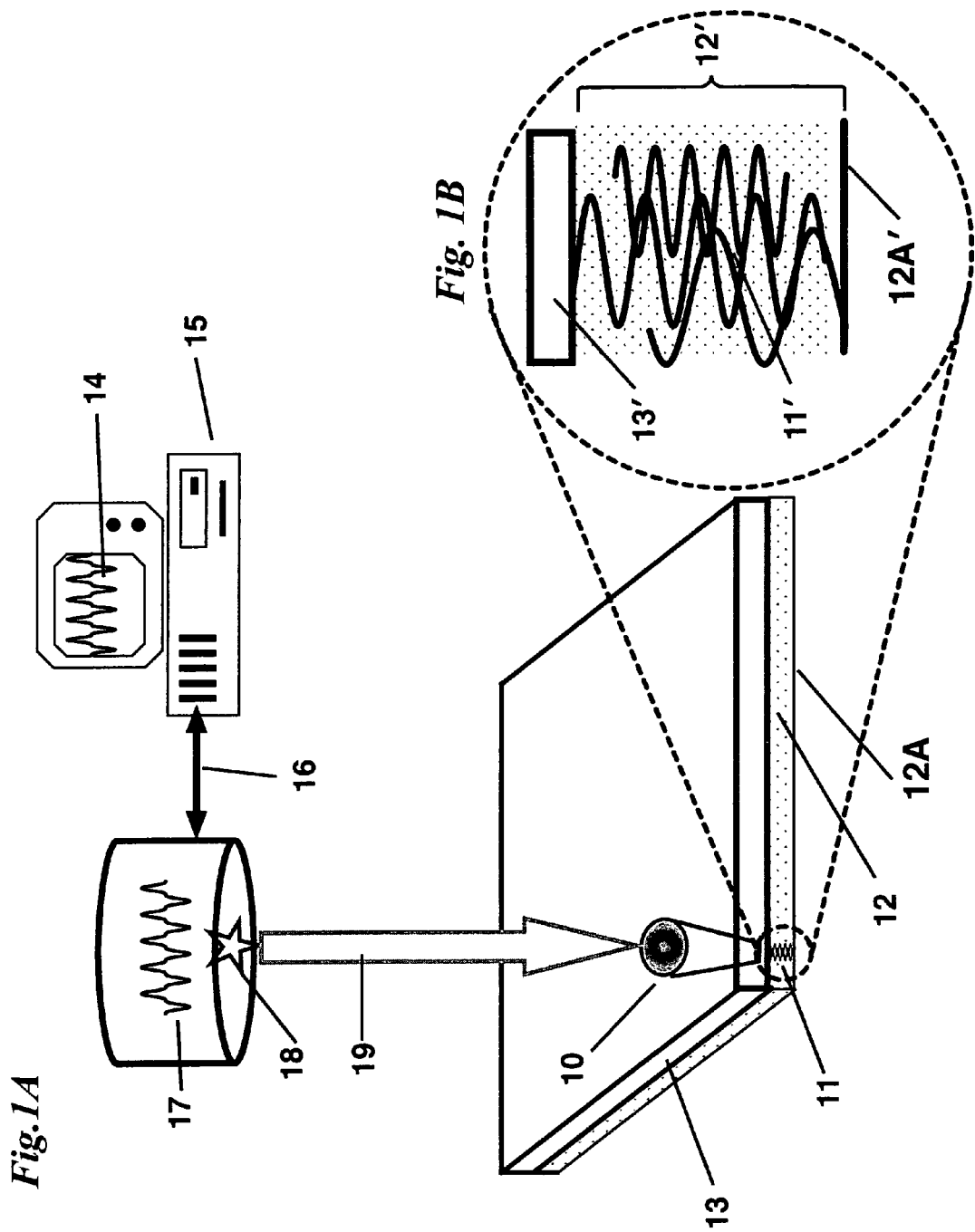

WAVE-BASED OPTICAL DATA STORAGE

The present application claims the benefit of provisional application Ser. No. 61/519,980 filed on Jun. 2, 2011 and is hereby incorporated herein by reference in its entirety.

TECHNICAL FIELD

The present invention relates to high-density, long-term, archival data storage, and more particularly to storage using electromagnetic waves embedded in photosensitive emulsions.

BACKGROUND ART

It is known in the prior art that the frequency of light waves can be captured in silver halide photographic emulsion in the form of vertically embedded standing waves, with a waves nodal points physically representing the frequency. In 1908 Gabriel Lippmann won the Nobel Prize in Physics "for his method of reproducing colours photographically based on the phenomenon of interference" (quoted on the Noble Prize website at nobelprize.org/nobel_prizes/physics/laureates/1908/). This technique was first described in 1891 to store and extract color information from specially constructed black and white photographic plates (Lippmann, G, "La Photographie des Couleurs," *Compte Rendes a l'Academie des Sciences*, Tome 112, pp 247-275, February 1891). While never commercialized successfully because of the difficulties of viewing the color image, reproducing the image beyond its first iteration on a glass plate, and the rudimentary, extremely slow photographic chemistry at the time, the Lippmann process is applied in the present invention in a novel methodology and apparatus for the storage of digital data as well as human-readable images and text, as described herein.

The ability to store data using light is generally limited by the wavelength of light. This has recently been exemplified by the introduction of so-called "Blu-Ray" DVD recorders. The shorter wavelength of the blue light source nearly doubles the recording density and, thus, the playing time. However, the lifetimes of such media are relatively short, ranging from a few years to possibly a century or a bit more if extreme care is taken to preserve the media against environmental damage.

In contrast, this invention teaches a methodology and an optical apparatus that provides long-term, archival storage due to the use of a chemically fixed photosensitive emulsion, such as silver halide, for the recording and playback media. In accelerated testing as known in the art, silver- or metallic-based photographic media have been estimated to last upwards of tens of thousands of years, without requiring special energy-intensive storage conditions—a true archival system for future generations (Wilhelm, H, "Long-Term Preservation of Photographic Originals and Digital Image Files . . . ", *IS&T's Archiving* 2008 *Conference in Bern, Switzerland*, Jun. 26, 2008, Society for Imaging Science and Technology, p. 4). In addition, this invention substantially increases optical storage density beyond that of current optical techniques.

The Lippmann process works as follows: The lightwave color palatte contains the information in the form of a ray representing the specific colors. This forward ray (entering through the transparent side of the storage medium) traverses the emulsion and is reflected back from a reflecting layer, (in Lippmann's specific case the reflective layer was a pool of liquid mercury). As the reflected light ray returns through the emulsion it combines with the forward ray, causing interference. This interference results in cancellation of the light at opposing wave nodes and reinforcement at the in-phase nodes. Thus, vertically through the emulsion, there are regularly spaced areas of exposure (where the waves reinforce), followed by areas of zero exposure where the waves cancel. (Mannheim, L A, *Photography Theory and Practice*, Amphoto, 1970, Vol I, Sect 58; Lippmann, op. cit.)

The Lippmann silver grains as exposed (and developed) are laid down in successive laminae coinciding with the antinodal planes of the standing waves recorded, equal to the half-wavelength of the light that forms the waves (Wood, R W, *Physical Optics*, Macmillan, 1934, pp 214-217, especially FIGS. 137-138 for the laminae). This is known in the art as a "Lippmann emulsion"—a relatively thick, transparent, and extremely fine-grained panchromatic photosensitive coating, as described in Lippmann's interference process. The spacing of the exposed vertical grains literally represents the wavelengths of the specific impinging light. For each color this spacing is, of course, different. A higher frequency (e.g., blue) causes more grains vertically to be exposed in a uniform pattern representing the peak amplitudes of the standing wave, and a lower frequency (e.g., red) causes fewer grains to be exposed vertically (viz.: figures at nobelprize.org, op.cit.; Wood, op.cit.; Mannheim, op. cit.; and Lippmann, op. cit.).

In Lippmann's original process, the colors represented a mapping of the actual colors of a scene focused on the special emulsion by a conventional camera apparatus. A full-color image with Lippmann process is reconstructed by shining a white light source at a critical angle through the developed and fixed emulsion toward the viewer, with the vertical interference columns being observed as the true colors of the original by the human visual system. In contrast, the present invention only needs to record a small region for each data pixel, plus monochromatic images, text and microtext, which simplifies the construction of the plate apparatus for the embodiments described herein.

The Lippmann emulsion is developed, as known in the art, using specified photographic chemistry for its ultra-fine grain processing (Wood, op. cit, pp 215-216; Rich, C, "Lippmann Photographic Process Put to Practice", SPIE v. 2688, Society of Photo-Optical Instrumentation Engineers (1996), pp. 88-95; U.S. Pat. No. 4,202,695; and Bjelkhagen, H I, *Silver-Halide Recording Materials for Holography and Their Processing*, Springer, 1995, esp. ch. 2.2.2, pp. 37ff on the preparation and developing formulae for Lippmann emulsions). For the present invention, the development process includes sufficient chemistry to dissolve a reflective layer completely if a reflection layer is deposited, depending on the material used to create it, yielding a plate with sufficient transparency so as to allow the interference patterns not to be obscured for readout. (The present invention's photosensitive plate does not include an anti-halation layer as with conventional photographic film since that would obviate the function of the reflective layer. Therefore this invention's development process need not have chemistry to dissolve such an anti-halation layer).

SUMMARY OF THE EMBODIMENTS

Our prior U.S. Pat. No. 6,985,294 Full Spectrum Color Projector, Issued on Jan. 10, 2006, Inventor: Johnson, et. al; U.S. Pat. No. 7,437,000, Full spectrum color detecting pixel camera, issued on Oct. 14, 2008, Inventor: Rosenthal, et. al; and U.S. patent application Ser. No. 11/975,954, High resolution High Speed Spectral Detection, filed Oct. 23, 2007, as amended, Inventor: Rosenthal, et. al., are hereby incorporated herein by reference.

In one embodiment, this invention provides an archival optical data storage system. This embodiment includes a first apparatus comprising:

a digital data input that receives the digital data to be recorded;

a light sensitive storage medium having a transparent top layer on which is deposited an emulsion on the bottom surface;

a first computer process coupled to the digital data input that assigns frequencies of interest into a light control signal;

a light source which is modulatible having a modulated input coupled to the light control signal;

a first positioning system in which the light source is mounted;

a second computer process, coupled to the first positioning system and to the first computer process, that controls the first positioning system, wherein the light source, the first positioning system, and the second computer process are configured to cause the light source to expose a usable area of the emulsion to light that is modulated in a manner corresponding to the digital data input creating in the emulsion vertical diffraction gratings corresponding to the recorded digital data;

an apparatus to develop the emulsion;

a second apparatus to read the data recorded in the developed and fixed emulsion deposited on the storage medium comprising:

a third computer process coupled to a second positioning system that controls the second positioning system;

a white light source irradiating the emulsion at the incident angle which causes diffraction of the white light source in the vertical gratings stored within the emulsion;

a detector mounted on the second positioning system and positioned at the data storage location sensing the diffracted output corresponding to the angle defined by the grating normal corresponding to each wavelength stored in the emulsion;

which detector detects the spectral components of the diffracted white light of a specific area of the emulsion containing the digital data;

a fourth computer process coupled to the spectral detector output that converts the spectral signal into digital data.

In a related embodiment the positioning systems as summarized above may be one and the same.

In the various embodiments of the invention there is provided a storage media, consisting of a transparent material, on one surface of which is deposited a Lippmann emulsion, and on the opposite surface a reflecting layer to be described below. In the present invention the Lippmann process, as described above in the background art, is further modified for data storage as follows:

On one surface of the plate. opposite the Lippmann emulsion, a coating may be applied if necessary that has an optically refractive index mis-match performing as an internal reflective layer over the specified frequency range. As known in the art, for example, an air-glass interface impinged by light waves at the correct angle creates a sufficient refractive mis-match to reflect light waves back towards its source. This methodology replaces the mercury pool that Lippmann used to reflect the standing waves. Since this invention is not being applied for reproducing a full-spectrum, interference-based color photograph, as was Lippmann's process which required an optically flat reflective backing, some degree of flexibility in the plate is feasible, and hence the refractive index mis-match described herein is a suitable—and simpler—methodology for the reflective layer.

For data storage the colors or frequencies represent bits. The surface of the emulsion is positioned for recording and playback in virtual regions, e.g., about one micron in diameter. Each of these virtual regions constitutes a data storage location. To record the data in the data storage location, the data storage location is illuminated with the specific light frequencies or colors representing the specific bits to be recorded. The color palate or frequencies for each data storage location may be generated as discussed in U.S. Pat. No. 6,985,294, or through other methods.

To select the data storage location on which to encode the data, and in readout to unambiguously locate the same data storage location, this invention modifies conventional magnetic hard disk drives which have the ability to precisely locate a position on a magnetic disk with vastly more accuracy than is required for this invention.

Multiple colors or frequencies define multiple bits, with each color or frequency representing a different number, e.g., base two or higher. That is, due to the multiple colors in each data storage location, each data storage location can represent a data word, as known in the art.

This invention is for permanent data storage. Data, text, microtext, and images are not re-writable. The purpose of this manifold implementation of methodology and apparatus is to present a media that is more likely to be recognized in the far future as a storage device for data and images, and with text and microtext in order to preserve and present in human readable form the necessary instructions for decoding the data recorded. The use of silver halide photographic apparatus and methodologies in this invention, which is known to have extremely long life, makes it well-suited for permanent archival storage. Other photosensitive methodologies and apparatus may also be used for the storage emulsion and media.

BRIEF DESCRIPTION OF THE DRAWINGS

The foregoing features of embodiments will be more readily understood by reference to the following detailed description, taken with reference to the accompanying drawings, in which:

FIGS. 1A and 1B illustrate the invention's methods and apparatus for one embodiment for writing a complex wavetrain representing an interference grating combining multiple frequencies for one pixel at one data storage location on a photosensitive medium.

DETAILED DESCRIPTION OF SPECIFIC EMBODIMENTS

Definitions

Figure 2A:
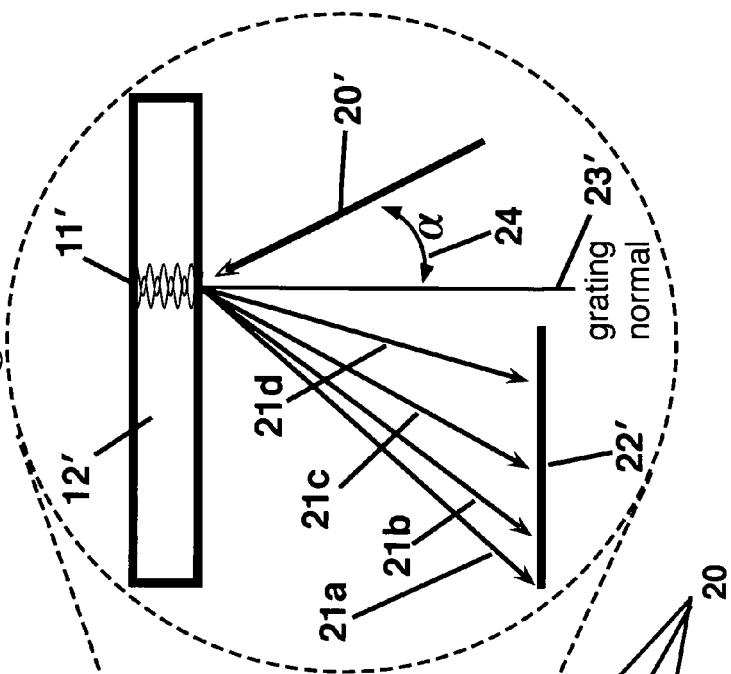
FIGS. 2A and 2B illustrate an embodiment wherein this invention locates with precision a data storage location and reads the frequencies representing the pixel's data.

As used in this description of the invention and the accompanying claims, the following terms shall have the meanings indicated, unless the context otherwise requires:

Pixel is synonymous with a data storage location which contains a data word. A Lippmann emulsion is an archival photosensitive layer (e.g., a chemical composition of silver halide, as known in the art, or an other archival photosensitive composition) having a thickness of several wavelengths of the color palatte of interest (e.g., approximately two microns), while its grain size is small enough to encode a vertical diffraction grating within the color palette of interest (similar to the Lippmann emulsion as described in Wood, op. cit., pp. 214-217 and FIGS. 137-138).

A data constellation is a multiple data set or word, or groups of data sets, wherein each constellation point may be defined as a different wavelength or frequencies stored in the photosensitive emulsion.

The grating normal is used to define the angle between the incidence light beam and the diffracted beam of its first order component (viz., Palmer C and Loewen E, *Diffraction Grating Handbook*, 6$^{th}$ Ed., 2005, Newport Corporation, Rochester, N.Y., chap. 2, "The Physics of Diffraction Gratings", esp. FIGS. 2.1, 2.2, 2.4 and 2.5; and Ditchburn R W, Light, Dover, 1991, pp. 181 ff).

A modulatible light source is an electromagnetic wave transmitter working in the light bands (i.e., infrared through visible light to ultraviolet and soft X-rays) that is capable of modulating or altering its wavelength or frequency output according to control signals from a processor.

A color palette is the range of colors, frequencies, and bandwidths of interest chosen by the processor for data storage and readout in the emulsion.

The embodiments of the invention described above are intended to be merely exemplary; numerous variations and modifications will be apparent to those skilled in the art. All such variations and modifications are intended to be within the scope of the present invention as defined in any appended claims.

FIG. 1A (and inset exploding one data storage location in FIG. 1B) illustrates one embodiment wherein processor 15 assigns light wave frequencies of interest representing digital data or data constellation 14 to light control signal 16 using apparatus 17 to be permanently recorded at data storage location 10 within Lippmann emulsion 12. Emulsion 12 is coated underneath transparent superstratum 13 (and FIG. 1B, 13') which includes substratum reflective layer 12A (and 12A') coated on interstitial emulsion 12's bottom edge. Apparatus 17, consisting of a precision hard disk driver magnetic head assembly (e.g., Western Digital Model WD800AAJB, Western Digital Corporation 20511 Lake Forest Drive Lake Forest, Calif. 92630) is modified by replacing the magnetic head with light source 18 (e.g., as taught in patent '294) capable of generating and modulating a modulatible beam 19 comprising the narrow light band frequencies to be exposed in emulsion 12. Link 16 also sends controls signals to apparatus 17 comprising the precision data storage location of beam 19 on superstratum 13. Light from beam 19 (1) penetrates emulsion 12 (and 12'); thence, (2) due the optical refractive index mis-match of the emulsion's surface with air a standing wave is reflected in a backwards direction through the emulsion; (3) the sum of the forward and reflected light waves creates a vertical interference grating which represents data 14 at one data storage location 10 (exploded in FIG. 1B). The emulsion is then developed to archival standards as known in the art (see references in background art section).

In a related embodiment, the reflective mechanism is a reflective layer deposited on the upper side of the superstratum.

In a related embodiment, the light source may be one or a plurality of lasers according to the frequencies of interest or color palette required (e.g., Circular 1 mm Beam, ULN, Ultra-Low Noise LabLaser 635 nm 5 mW C ULN, Part No. 31-0144-000, Coherent Inc. 5100 Patrick Henry Drive Santa Clara, Calif. 95054 USA).

In a related embodiment, the light beam is transmitted via a fiber optic, or similar device, with the location of the fiber tip adjacent to the storage medium being controlled by the modified precision disk driver apparatus.

In a related embodiment, separate, multiple vertical gratings per data storage location unique to each frequency and adjacent to each other are recorded as per the methodology and apparatus above.

In a related embodiment, separate, multiple vertical gratings per data storage location unique to each frequency and at different depths in the same data storage location are recorded as per the methodology and apparatus above.

In a related embodiment, separate, multiple vertical gratings per data storage location unique to each frequency and at different irradiation levels in the same data storage location are recorded as per the methodology and apparatus above.

In related embodiments, the frequencies may range from the infrared to the ultraviolet or soft x-rays.

FIG. 2A (and inset, FIG. 2B, exploding the diffraction mechanism at the data storage location) illustrates retrieval of the spectral data stored in diffraction grating 11 embedded vertically in emulsion 12 by illuminating emulsion 12 with incident white light beam 20. Diffracted light 21 captured along the path of the grating normal angle (illustrated in FIG. 2B inset) will contain only those frequencies that had been encoded earlier (as described in FIGS. 1A and 1B). Each specific frequency stored in emulsion 12 at data storage location 10 radiates embedded diffraction grating 11's spectral components according to grating normal 23 angle with incident beam 20. Diffracted beam 21 is detected with spectrometer 22 (for example, patents '000, '294, or application '974 cited herein) which sends spectral data on link 16 corresponding to the digital value of the data recorded at data storage location 10 which is then output to data processor 15.

Figure 2B:
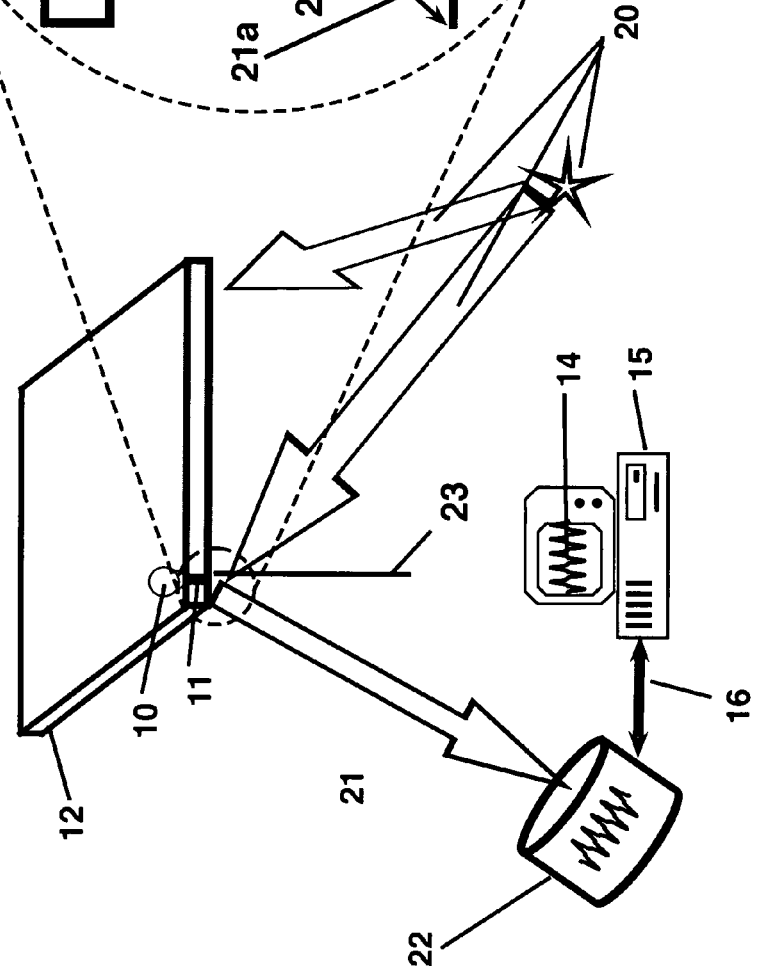

FIG. 2B (based on Palmer, op, cit. FIG. 2-5) illustrates in more detail one example of how the grating normal angle, as known in the art, works to disperse the incident light into the component spectral frequencies stored at data storage location 10 in FIG. 2A. Incident light beam 20' irradiates at positive angle $\alpha$ (24) from grating normal 23' (and FIG. 2A, 23) diffraction grating 11' embedded in emulsion 12'; the light is diffracted toward spectrometer detector 22' according to the frequencies of interest as selected by the processor in negative spectral diffraction angles 21$a$, 21$b$, 21$c$, and 21$d$. Detector 22' is configured so as to receive the diffracted output corresponding to the angle defined by the grating normal corresponding to each wavelength stored in the emulsion.

In a related embodiment the emulsion is irradiated from a white light source adjacent to the emulsion and the data storage location being read.

In a related embodiment, the output beam is detected via a fiber optic, or similar device, connected to the spectrometer, with the location of the fiber tip adjacent to the storage medium at the data storage location. The entry port of the fiber optic is large enough to receive the spectral output of the vertical gratings stored in the emulsion at the grating angle corresponding to the stored wavelengths.

What is claimed is:
1. A write-once data storage system comprising:
a digital data input that receives digital data to be recorded;
a processor, coupled to the digital data input, running a first process that assigns frequencies of interest into a light control signal to store the digital data;
a light sensitive storage medium having a transparent top layer on which is deposited a Lippmann emulsion on the bottom surface, wherein the emulsion has a thickness of several wavelengths of the assigned frequencies of inter- est and a grain size small enough to encode a vertical diffraction grating for each of the assigned frequencies of interest;

a light source that produces a beam having all of the assigned frequencies of interest existing at the same time, wherein a subset of the assigned frequencies of interest containing less than the total number of the assigned frequencies of interest is produced to have a continuous wavelength bandwidth from a lowest to a highest frequency of the subset and the beam is manipulated to cause each wavelength contained within the continuous wavelength bandwidth to have substantially the same amplitude level, wherein the light source is modulatible, having a modulated input coupled to the light control signal;

a positioning system within which the light source is mounted; and the processor, also being coupled to the positioning system, running a second process that controls the positioning system, wherein the processor controls the light source and the positioning system to cause the beam to expose a usable area of the emulsion to light that is modulated in a manner corresponding to the digital data input to create vertical diffraction gratings in the emulsion, wherein each vertical diffraction grating is created to correspond to only one of the assigned frequencies of interest and to correspond to the recorded digital data, wherein the vertical diffraction gratings are stored in the emulsion and provide archival storage of the digital data.

2. The write-once data storage system according to claim 1 having an apparatus to develop the emulsion.

3. The write-once data storage system of claim 1, further comprising:

a white light source irradiating the emulsion at an incident angle which causes diffraction of the white light source in the vertical diffraction gratings stored within the emulsion so as to produce a diffracted output at angles corresponding to wavelengths defined by the vertical diffraction gratings;

a detector, mounted on the positioning system, to detect the diffracted output from a data storage location in the emulsion and to detect spectral components of the diffracted output at the data storage location and provide a spectral signal; and the processor, further being coupled to an output of the detector, running a third process that converts the spectral signal into the digital data.

4. A method for storing data comprising:

receiving digital data to be recorded at a digital data input;

coupling a processor to the digital data input;

running a first process on the processor that assigns frequencies of interest into a light control signal to store the digital data;

providing a light sensitive storage medium having a transparent top layer on which is deposited a Lippmann emulsion on the bottom surface, wherein the emulsion has a thickness of several wavelengths of the frequencies of interest and a grain size small enough to encode a vertical diffraction grating for each of the frequencies of interest;

providing a light source;

producing a beam having all of the assigned frequencies of interest existing at the same time with the light source;

manipulating the beam to produce a subset of the assigned frequencies of interest containing less than the total number of the assigned frequencies of interest, wherein the subset is produced to have a continuous wavelength bandwidth from a lowest to a highest frequency of the subset;

manipulating the beam to cause each wavelength contained within the continuous wavelength bandwidth to have substantially the same amplitude level;

coupling the light source to the light control signal;

modulating the light source according to the light control signal;

providing a positioning system within which the light source is mounted;

coupling the positioning system to the processor;

running a second process that controls the light source and the positioning system to cause the beam to expose a usable area of the emulsion to light that is modulated in a manner corresponding to the digital data input;

creating vertical diffraction gratings in the emulsion, wherein each vertical diffraction grating is created to correspond to only one assigned frequency of interest and to correspond to the recorded digital data;

storing the vertical diffraction gratings in the emulsion; and providing archival storage of the digital data.

* * * * *